United States Patent
De Magalhaes

(10) Patent No.: US 9,910,640 B2
(45) Date of Patent: Mar. 6, 2018

(54) MODELING REPRESENTATIONAL STATE TRANSFER APPLICATION PROGRAMMING INTERFACES

(71) Applicant: International Business Machines Corporation, Armonk, NY (US)

(72) Inventor: Arthur L. De Magalhaes, Markham (CA)

(73) Assignee: International Business Machines Corporation, Armonk, NY (US)

(*) Notice: Subject to any disclaimer, the term of this patent is extended or adjusted under 35 U.S.C. 154(b) by 180 days.

(21) Appl. No.: 14/278,415

(22) Filed: May 15, 2014

(65) Prior Publication Data

US 2015/0331675 A1 Nov. 19, 2015

(51) Int. Cl.
*G06F 9/44* (2006.01)
*G05B 19/042* (2006.01)
*H04L 12/24* (2006.01)
*H04L 29/08* (2006.01)

(52) U.S. Cl.
CPC .............. *G06F 8/20* (2013.01); *G06F 8/35* (2013.01); *G06F 8/70* (2013.01); *G05B 19/0426* (2013.01); *G05B 2219/25067* (2013.01); *G06F 8/34* (2013.01); *G06F 9/4428* (2013.01); *H04L 41/22* (2013.01); *H04L 67/02* (2013.01)

(58) Field of Classification Search
CPC ..... G06F 8/34; G06F 8/20; G06F 8/24; G06F 8/33; G06F 9/4428; G05B 19/0426; G05B 2219/25067; G05B 2219/32128; H04L 41/22
See application file for complete search history.

(56) References Cited

U.S. PATENT DOCUMENTS

| 8,073,887 | B2* | 12/2011 | Baldwin | G06F 17/3089 |
| | | | | 707/770 |
| 9,201,633 | B2* | 12/2015 | Kalapati | G06F 8/34 |
| 2009/0077477 | A1 | 3/2009 | Khan et al. | |
| 2009/0164485 | A1* | 6/2009 | Burke | G06F 17/30961 |
| 2009/0172566 | A1* | 7/2009 | Mosher | G06F 8/34 |
| | | | | 715/762 |

(Continued)

FOREIGN PATENT DOCUMENTS

EP    2383684 A1    11/2011

OTHER PUBLICATIONS

Prakash Subramaniam, REST API Design—Resource Modeling, Aug. 14, 2014, ThoughWorks, retrieved online on Sep. 17, 2017, pp. 1-21. Retrieved from the Internet: <URL: https://www.thoughtworks.com/insights/blog/rest-api-design-resource-modeling>.*

(Continued)

*Primary Examiner* — Hanh T Bui
(74) *Attorney, Agent, or Firm* — David B. Woycechowsky

(57) ABSTRACT

Modeling representational state transfer application programming interfaces by performing the following steps: (i) receiving REST schema information defining a REST schema; (ii) organizing into a non-cyclic object graph according to a hierarchy, a set of hypertext transport protocol (HTTP) endpoints, with each endpoint respectively including a portion of the REST application so that the set of HTTP endpoints are individually addressable by uniform resource locator (URL) addresses; and (iii) for each HTTP endpoint of the set of HTTP node types, assigning node types based on the REST schema.

18 Claims, 9 Drawing Sheets

(56) References Cited

U.S. PATENT DOCUMENTS

| | | | | |
|---|---|---|---|---|
| 2009/0204940 A1* | 8/2009 | Kodosky | G06F 8/34 | 717/106 |
| 2009/0235231 A1* | 9/2009 | Kodosky | G06F 8/34 | 717/109 |
| 2009/0265684 A1* | 10/2009 | Fuchs | G06F 8/34 | 717/105 |
| 2010/0094884 A1* | 4/2010 | Baldwin | G06F 17/3089 | 707/755 |
| 2010/0100868 A1 | 4/2010 | Shukla et al. | | |
| 2010/0145946 A1* | 6/2010 | Conrad | G06F 17/30887 | 707/736 |
| 2011/0302316 A1* | 12/2011 | Chou | H04L 67/02 | 709/228 |
| 2011/0321006 A1* | 12/2011 | Kodosky | G06F 8/34 | 717/109 |
| 2012/0324034 A1* | 12/2012 | Burkhardt | G06F 17/30876 | 709/212 |
| 2013/0046792 A1 | 2/2013 | De Magalhaes | | |
| 2013/0046794 A1 | 2/2013 | De Magalhaes | | |
| 2015/0040100 A1* | 2/2015 | Kalapati | G06F 8/34 | 717/109 |

OTHER PUBLICATIONS

Markus Gulden and Stefan Kugele, A Concept for Generating Simplified RESTful Interfaces, ACM, 2013, retrieved online on Sep. 17, 2017, pp. 1391-1398. Retrieved from the Internet: <URL: http://delivery.acm.org/10.1145/2490000/2488181/p1391-gulden.pdf?>.*

"Document Object Model (DOM)", W3C®, Architecture domain, Jan. 19, 2005, Copyright © 1997-2005 W3C®, <http://www.w3.org/DOM/>.

"Eclipse Modeling Framework Project (EMF)", provided in Main Idea of Disclosure by Inventor on Nov. 21, 2013, Copyright © 2014 The Eclipse Foundation, <http://www.eclipse.org/modeling/emf/?project=sdo>.

"Package com.ibm.xml.xapi", provided in Main Idea of Disclosure by Inventor on Nov. 21, 2013, <http://pic.dhe.ibm.com/infocenter/wasinfo/v8r0/topic/com.ibm.websphere.javadoc.xml.doc/javadoc/com/ibm/xml/xapi/package-summary.html>.

* cited by examiner

MODELING REPRESENTATIONAL STATE TRANSFER APPLICATION PROGRAMMING INTERFACES

BACKGROUND OF THE INVENTION

The present invention relates generally to the field of computer modeling, and more particularly to modeling and managing representational state transfer application programming interfaces.

REST (representational state transfer) is an architectural style consisting of a coordinated set of constraints, within a distributed hypermedia system, applied to: (i) components; (ii) connectors; and/or (iii) data elements. REST ignores protocol syntax and the details of component implementation in order to focus on: (i) the roles of components; (ii) interaction constraints with other components; and/or (iii) interpretation of significant data elements. REST has been applied to: (i) describing desired web architecture; (ii) identifying existing problems; (iii) comparing alternative solutions; and/or (iv) ensuring that protocol extensions would not violate core constraints that make a successful world wide web.

An object graph is a view of an object system at a particular point in time. A normal data model such as a UML (unified modeling language) class diagram details the relationships between classes, but an object graph, on the other hand, relates their instances. An object-oriented application typically contains a complex web of interrelated objects, and these objects are linked to each other by: (i) one object owning another object; (ii) one object containing another object; and/or (iii) one object holding a reference to another object. This web of objects is called an object graph. An object graph is a relatively abstract structure that can be used in discussing an application's state. An object graph is a directed graph. An object graph is a non-cyclic graph, but allows for random access. Because it is random access this means that someone navigating a parent can go to its children, and its children can go back to its parent when stored in volatile memory, objects occupy different segments of the memory with their attributes and function table, while relationships are represented by pointers or a different type of global handler in higher-level languages.

More and more companies are exposing HTTP (hypertext transfer protocol) endpoints that can be used for performing certain services, requesting data, etc. A single endpoint is a single part of a web/REST application (which in turn can belong to a set of applications). Therefore, an application is constituted by a set of endpoints, and (ii) each endpoint may be described as a portion of a REST application. In theory, these endpoints follow the REST (representational state transfer) pattern where: (i) there is an HTTP verb (GET, POST, DELETE, etc.) that describes the action; (ii) a resource name in the URL (uniform resource locator) describing which resource to apply the action to; and (iii) (optionally) a payload representing a new or updated resource. An example of code (including all three parts (i), (ii) and (iii)) corresponding to an example HTTP endpoint is as follows: "PUT http://host:port/myBank/employees/bob" with a JSON payload "{'telephone': '123-45678'}", where: (i) the HTTP verb in the example is "PUT", which indicates the action to update the resource; (ii) the resource name in the URL is "bob", because that is identifying the specific resource being worked with; and (iii) the payload that will be updated is {'telephone': '123-45678'}".

However, in reality, today's systems are much more complicated than this simple notion. Each URL contains many optional, or required, query parameters. The URLs may require: (i) special headers; (ii) specifically structured payloads; and/or (iii) different security models. An example of setting a special header in pseudo code is as follows:

```
URL url = new URL("https://host:port/myApp/weather");
HttpsURLConnection connection = url.openConnection( );
connection.addRequestProperty("specialHeader1", "myValue");
connection.addRequestProperty("specialHeader2", "myValue");
```

An example of code to provide extra security models set on the connection:

```
connection.setRequestProperty("Authorization", "Basic abc bob");
connection.setHostnameVerifier(allowAll);
connection.setSSLSocketFactory(myFactory);
```

A specifically structure payload would be a payload that must follow a certain pattern to be accepted, for example, some conventional payloads must have some elements, while other elements are optional as shown in the following example code:

```
{
"name" : String // required
"address" : String //required
"age" : int //optional
}
```

SUMMARY

According to an aspect of the present invention, there is a method, system and/or computer program product that performs the following steps (not necessarily in the following order): (i) receiving REST schema information defining a REST schema; (ii) organizing into a non-cyclic object graph according to a hierarchy, a set of hypertext transport protocol (HTTP) endpoints, with each endpoint respectively including a portion of the REST application so that the set of HTTP endpoints are individually addressable by uniform resource locator (URL) addresses; and (iii) for each HTTP endpoint of the set of HTTP node types, assigning node types based on the REST schema.

DETAILED DESCRIPTION

Figure 1:
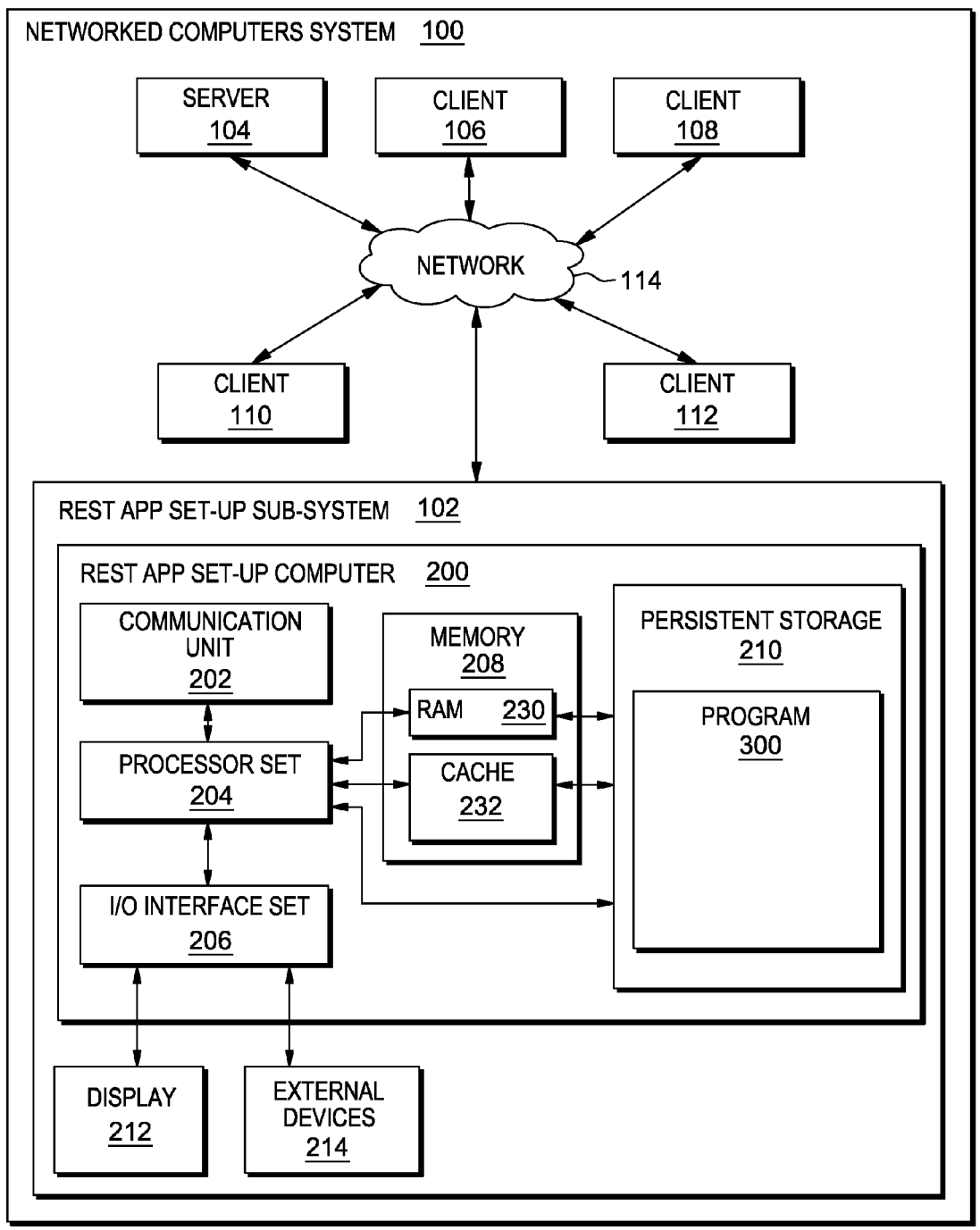
FIG. 1 is a schematic view of a first embodiment of a system according to the present invention.

In some embodiments of the present invention, a REST (representational state transfer) application is implemented as an object graph which uses a hierarchy of schema types, and where changing of a "type instance" of a resource has a bi-directional result, or effect. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: REST application set-up sub-system 102; server sub-system 104; client sub-systems 106, 108, 110, 112; communication network 114; REST application set-up computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. EXAMPLE EMBODIMENT

Figure 2:
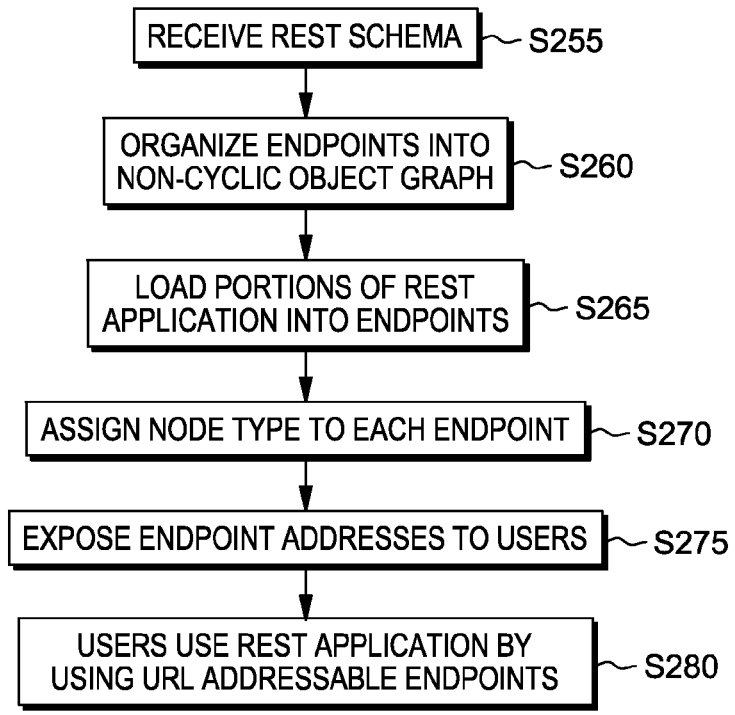
FIG. 2 is a flowchart showing a method performed, at least in part, by the first embodiment system.
Figure 3:
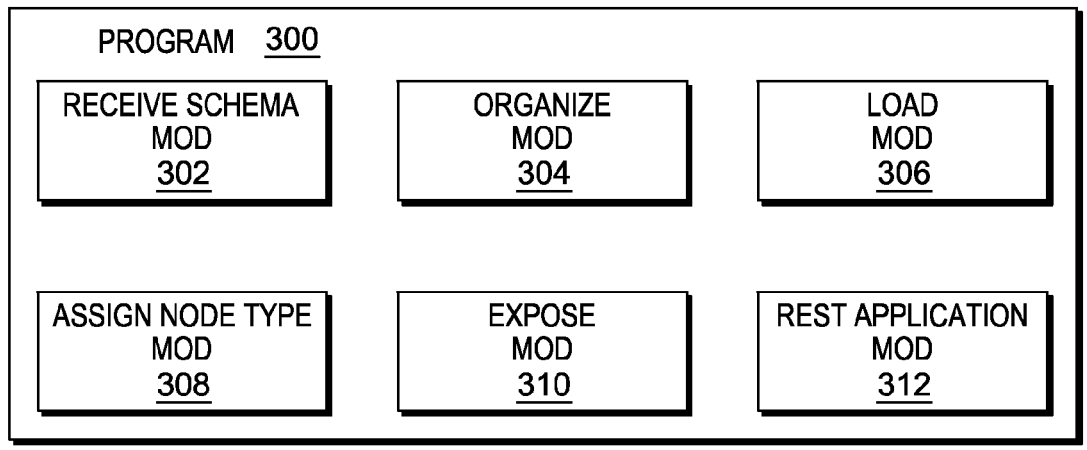
FIG. 3 is a schematic view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where receive schema module ("mod") 302 receives a REST schema. "REST Schema" is a concept involved in some embodiments of the present invention, and it defines a set of types (and the relationship between them) that will guide a REST application designer to model her REST application using an object graph. In this way, the REST application can be modeled in a hierarchy based on the REST schema. This hierarchical modeling may be performed either before or after creating the REST application. The REST schema is the same across every REST application, which is a potential benefit for clients consuming some embodiments of REST applications according to the present invention. This is because a client can be informed of the expected format of the object graph and can navigate/manage every REST application the same way.

In this embodiment of FIGS. 1 to 3, a schema, common for all REST interfaces, is used to formally define this hierarchy. According to the REST schema: (i) node types, defined on the REST schema, can infer their HTTP relevance; (ii) elements of type "root" map to the application's root URL; (iii) elements of type "path" map to URL paths, and are children of "root"; (iv) elements called "endpoint" represent a particular HTTP endpoint for a path, and are children of "path"; (iv) attributes attached to an endpoint element map to special properties of that connection point, such as its type (HTTP method) or a boolean for whether it supports cross-domain resource sharing, etc.; (v) elements of type "request_container" (child of endpoint element) contain children elements that describe the different components that may be specified during a request, such as payload, query parameters, headers, etc.; (vi) elements of type "response_container" (child of endpoint element) contain children elements that describe the different components that may be specified during a response, such as payload, headers, return code, etc.; and (vii) the namespace of the graph nodes determines the root URL that they are specific to, such as "www.companyname.com", or may be left unassigned (that is, " ") for nodes that are common to more than one (1) root parent, in case of interlinked applications.

Processing proceeds to step S260, where organize mod 304 organizes a set of HTTP endpoints into a non-cyclic object graph which defines a hierarchical relationship among and/or between the various URL-addressable HTTP endpoints. A more detailed example of this will be set forth, below, in the Further Comments And/Or Embodiments sub-section of this Detailed Description section. The HTTP endpoints are individually addressable by respectively assigned uniform resource locator (URL) addresses.

Processing proceeds to step S265, where load mod 306 loads portions of REST application 312 into the various URL-addressable HTTP endpoints. For example, these portions of the REST application may correspond to REST APIs. A more detailed example of this step will be set forth, below in the Further Comments And/Or Embodiments sub-section of this Detailed Description section.

Processing proceeds to step S270, where assign node type mod 308 assigns a node type to each HTTP endpoint. The node type assignments are based on the REST schema received at step S255. A more detailed example of this step will be set forth, below in the Further Comments And/Or Embodiments sub-section of this Detailed Description section.

Processing proceeds to step S275, where expose mod 310 exposes the URL-addressable HTTP endpoints organized according to the hierarchical non-cyclic object graph. More specifically, the HTTP endpoints are uploaded to server sub-system 104 (see FIG. 1) and server system 104 is configured so that the URL-addressable HTTP endpoints can be accessed there through communication network 114 by using the assigned URL addresses.

Figure 4:
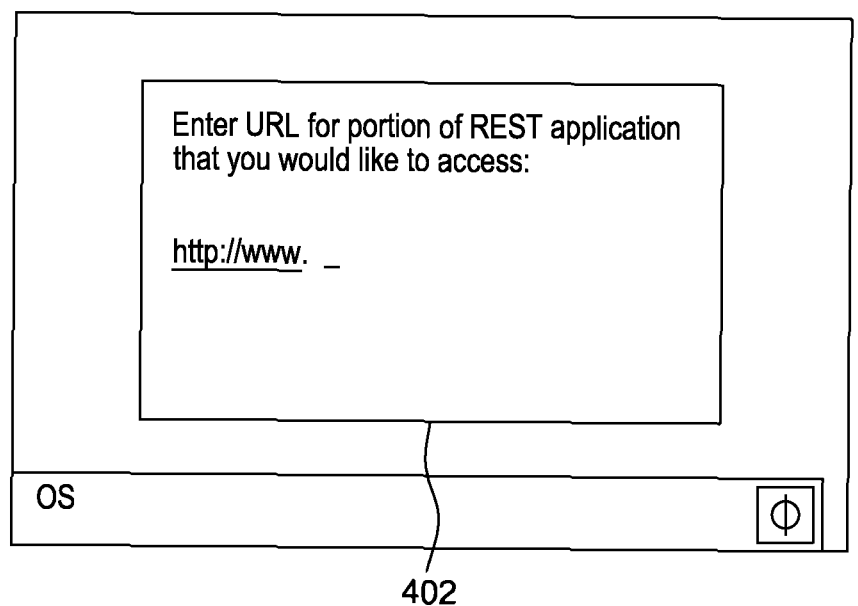
FIG. 4 is a screenshot view generated by the first embodiment system.

Processing proceeds to step S280, where users (see FIG. 1 at client sub-systems 106, 108, 110, 112) use the REST application by using the URL addresses of the URL-addressable HTTP endpoints, which respectively hold the various portion of the REST application (for example, the REST APIs), as they are stored and served by sub-system 104. As shown in FIG. 4 at window 402 of screenshot 400, a user is using the REST application by invoking its URL-addressable HTTP endpoints which are: (i) arranged according to the non-cyclic object graph hierarchy; and (ii) have been assigned node types according to the REST schema.

III. FURTHER COMMENTS AND/OR EMBODIMENTS

Some embodiments of the present invention expose a complex system of REST (representational state transfer) APIs (application programming interface) to clients. A conventional way of exposing APIs to clients is to produce a list that associates the available URLs (uniform resource locator), HTTP (hypertext transfer protocol) verbs, and payloads. Some conventional software solutions read a REST application and produce this list automatically. However, in these conventional systems, a human client is still needed to read, understand and/or use the documentation (including, for example, instructions on how to use/access the endpoint, the URL, the verb to use, the accepted payloads, etc. This creates a potential problem, recognized by some embodiments of the present invention, because there is no current standard on how to present (document) this information, so conventional systems are not amenable to machine logic for automatically (that is, without substantial human intervention) "understanding" how to use a REST API. Rather, in currently conventional systems, a human is needed to read and understand the API, through the grammar and context presented in the documentation. Some embodiments of the present invention solve this problem by constructing a documentation which is both easy to read by humans, and, at the same time, standardized such that a machine can be programmed to crawl through its highly structured content in a rule based way.

Some embodiments of the present invention manage a large system of related REST APIs (for example, a set of REST APIs used across a large business enterprise) in a way that includes one, or more, of the following features, characteristics and/or advantages: (i) re-usability of API descriptions and/or content; (ii) easy way to group common sets of APIs together; and/or (iii) when documentation or statistics are generated, interconnected REST URLs (or alias URL) do not all appear as unique endpoints, which makes the documentation or statistics easier to understand or manage. With respect to item (iii) in the previous list, in a large enterprise there may well be over 10,000 interconnected REST URLs (and/or alias URLs), so it can be overwhelming for a human user if every URL appears as a unique endpoint.

Some embodiments of the present invention may include one, or more, of the following features, characteristics and/or advantages: (i) REST API documentation generating software that generates information related to valid header values; and/or (ii) REST API documentation generating software that generates information related to "valid payload structures" (that is, a payload structure that conforms to the expected schema and/or format of the payload). To help show this aspect, the following code expands on the example set forth above:

```
{
"name" : String // required
"address" : String //required
"age" : int //optional
}
```

A "valid payload", according to the schema/format above would be given by the following example code:

```
{
"name" : "arthur"
"address" : "123 fake street"
}
```

While an example of code for an invalid payload (invalid because it is missing a required element) would be as follows:

```
{
"name" : "arthur"
"age": 45
}
```

Some embodiments of the present invention may include one, or more, of the following features, characteristics and/or advantages: (i) REST API documentation generating software that generates information related to cross-domains that are supported; (ii) provides re-usability of API descriptions and/or content; (iii) provides an easy way to group common sets of REST APIs together; (iv) when an enterprise has a large number of interconnected REST URLs (or alias URLs), generates documentation/statistic, where endpoints have a hierarchical (or tree) structure; (v) when an enterprise has a large number of interconnected REST URLs (or alias URLs), generates documentation/statistic, where REST URL nodes are easier to manage; and/or (vi) make it easier for a system administrator to visualize a REST application with a large number of endpoints (for example, more than 10,000 endpoints) in order to better determine what endpoints are redundant and can be removed.

Some embodiments of the present invention may include one, or more, of the following features, characteristics and/or advantages: (i) model the HTTP endpoints into a connected object graph; (ii) the endpoints are easily organized into a hierarchy of URL nodes; (iii) a schema, common for all REST interfaces, can be used to formally define this hierarchy; (iv) node types, defined on the REST schema, can infer their HTTP relevance; (v) elements of type "root" map to the application's root URL; (vi) elements of type "path" map to URL paths; (vii) elements called "endpoint" represent a particular HTTP endpoint for a path; (viii) attributes attached to an endpoint element, map to special properties of that connection point (such as its type (HTTP method) or a Boolean for whether it supports cross-domain resource sharing, etc.); (ix) elements of type "request_container" (child of endpoint element) contain children elements that describe the different components that may be specified during a request; (x) elements of type "response_container" (child of endpoint element) contain children elements that describe the different components that may be specified during a response; and/or (xi) the namespace of the graph nodes determines the root URL that they are specific to, such as "www.company.com", or may be left unassigned (that is: " ") for nodes that are common to more than one (1) root parent, in case of interlinked applications.

Further with regard to item (ix) in the paragraph above, examples of the different components that may be specified during a request are: (a) such as payload; (b) query parameters; and/or (c) headers.

Further with regard to item (x) two paragraphs above, examples of the different components that may be specified during a response are: (a) payload; (b) headers; and/or (c) return code.

Utilizing this well defined object graph, there are various ways of exposing endpoints to clients by: (i) exposing the actual graph for programmatically access (that is: using DOM (document object model) or XCI (extensible chart integration)); (ii) serializing the entire graph into a full documentation page; (iii) using XPath (extensible markup language path)/XQuery (extensible markup language query)/XSLT (extensible stylesheet language transformations) to pick out pieces of the application or to transform its data into a variety of different output formats (such as HTML (hypertext markup language) or JSON (JavaScript® object notation)); and/or (iv) sending parts of the nodes on the wire (HTTP payload) to other graph-handling components such a ESB (enterprise service bus) modules or SOAP (simple object access protocol) handlers.

FIGS. 5A through 5F, respectively, are tree diagrams 500*a* to 500*f* showing various portions of enterprise cyclic graph data structure 500. As shown by FIGS. 5A to 5F, enterprise cyclic graph data structure 500 includes the following nodes arranged in a hierarchy: www.company.sample.com URL node (also called "root API") 502; services node 503; jobs node 504; software node 506; support node 508; login node 510; type="root" node 512; namespace="www.company.sample.com" node 514; child paths nodes 503, 504, 506, 508, 510; endpoint node 516; type="http_GET" node 518; request node 520; type="request_container" node 522; language node 524; date node 526; type="query_param" node 528; optional="true" node 530; type="http_header" node 532; response node 534; type="response_container" node 536; payload node 538; content-length node 540; type="json" node 542; "version":integer node 544; type="http_header" node 546; products node 548; endpoint node 550; request node 552; response node 554; keywords node 558; payload node 560; type="query_param" node 562; optional="true" node 564; type="json" node 566; "productname": string node 568; endpoint node 570; type="http_POST" node 572; request node 574; response node 576; payload node 578; payload node 580; "productidea": string node 582; type="json" node 584; type="text" node 586; reference# node 588; hardware node 590; securitydomain="partners" node 592; administrator node 594; and administrator node 596.

Tree diagrams 500*a* to 500*f* are based upon an example website, www.company.sample.com URL node 502, and show those of skill in the art how to model and manage a set of REST APIs according to an embodiment of the present invention.

Figure 5A:
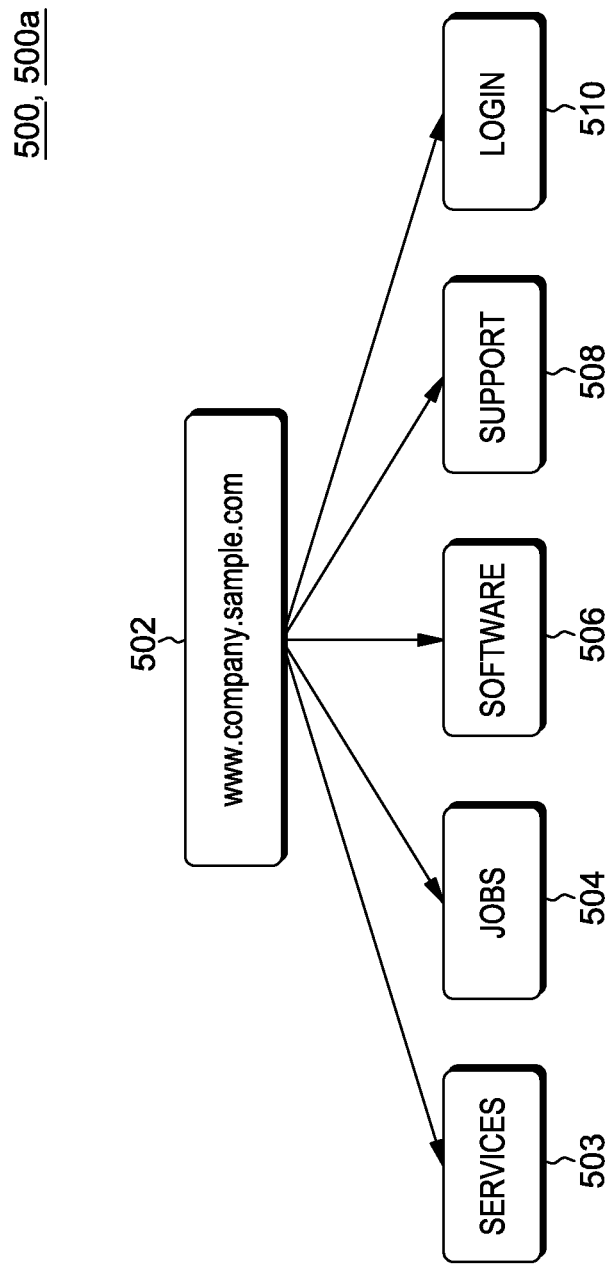
FIG. 5A is a diagram view of a second embodiment of a system according to the present invention.

As shown is FIG. 5A, assume that www.company.sample.com node 502 has five (5) links to subpages: (i) services node 503; (ii) jobs node 504; (iii) software node 506; (iv) support node 508; and (v) login node 510.

The APIs can then be modeled by constructing an object graph using either: (i) DOM; (ii) EMF (eclipse modeling framework); and/or (iii) XCI technologies. Although this model is very simple, and populating it with useful details has yet to be started, some of the potential advantages of modeling the REST APIs as an object graph can be seen. The top node could be programmatically queried for its children (child paths 503, 504, 506, 508, 510), which would result in links that could then be followed.

Figure 5B:
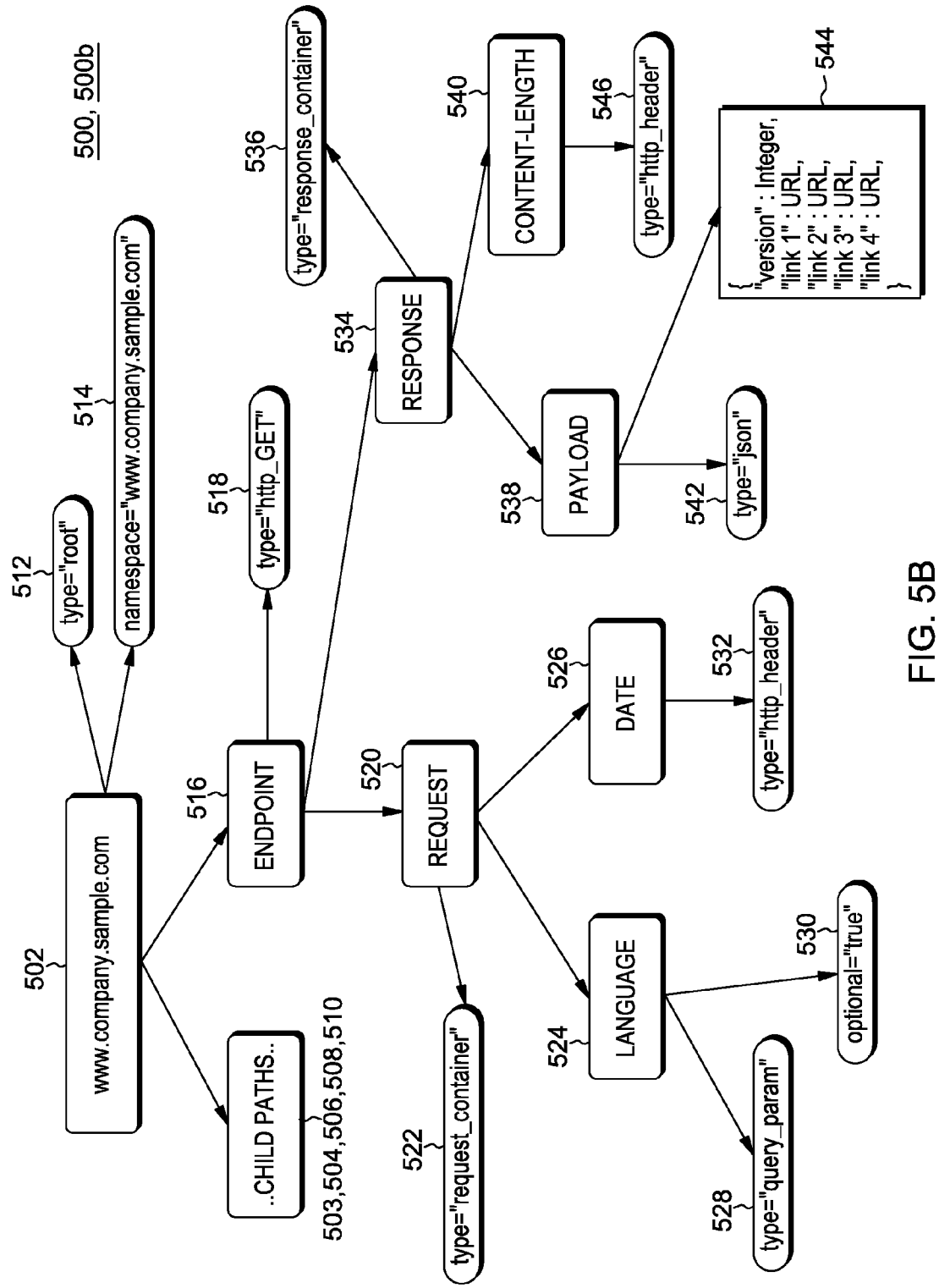
FIG. 5B is another diagram view of the second embodiment system.

As an example, some of these APIs to populate the object graph will now be discussed. As shown in FIG. 5B, the diagram illustrates a potential object graph model of the root API, www.company.sample.com node 502. This graph shows the endpoints supported, in this case HTTP GET node 518, and details about the structure of the request and response. This is all the information necessary for API clients to use the system. Every node also has a type, mapping the node to the object graph's schema, which identifies the nature of that node.

One potential advantage of this model is that it can be: (i) consumed by machines (that is, navigating the object graph using some algorithm to match particular node types and look for particular information); and/or (ii) consumed by humans that are looking at the visual representation of the object graph. As previously mentioned, this object graph can easily be serialized (written) into any data format that the user wishes (PDF (portable document format), XML (extensible markup language), JSON, Text, HTML, etc.) using current object-based technologies such as XCI, EMF or DOM.

Furthermore, by utilizing an object graph representation of REST APIs, the system can be managed easier. A search can be quickly performed for certain URL patterns or particular types of response by applying well known graph-based algorithms such as XPath or XQuery, and the in-memory model can be enhanced even further by applying known optimization algorithms. Some embodiments of the present invention allow the object graph to have dynamic storage capability and be populated from a variety of different data sources. For example, assume there is an XML document that describes: (i) some REST APIs; (ii) another document with JSON text that describes some security domain; and/or (iii) a third document as a spreadsheet that describes additional endpoints. Further assume there is an XCI adapter that implemented different mediators (one for each data source) and congregated the data in an object-graph where your REST application could be: (i) navigated; (ii) serialized; and/or (iii) managed as a single object tree.

For a software architect of an enterprise-level REST application, the tasks of designing new APIs that fit into the existing application in an efficient manner can be hard to accomplish. For example, if the system architect is dealing with a long text based list of 10,000+ URLs, it may be difficult for a human user to identify current patterns that can be used, or current solutions that are already available.

Figure 5C:
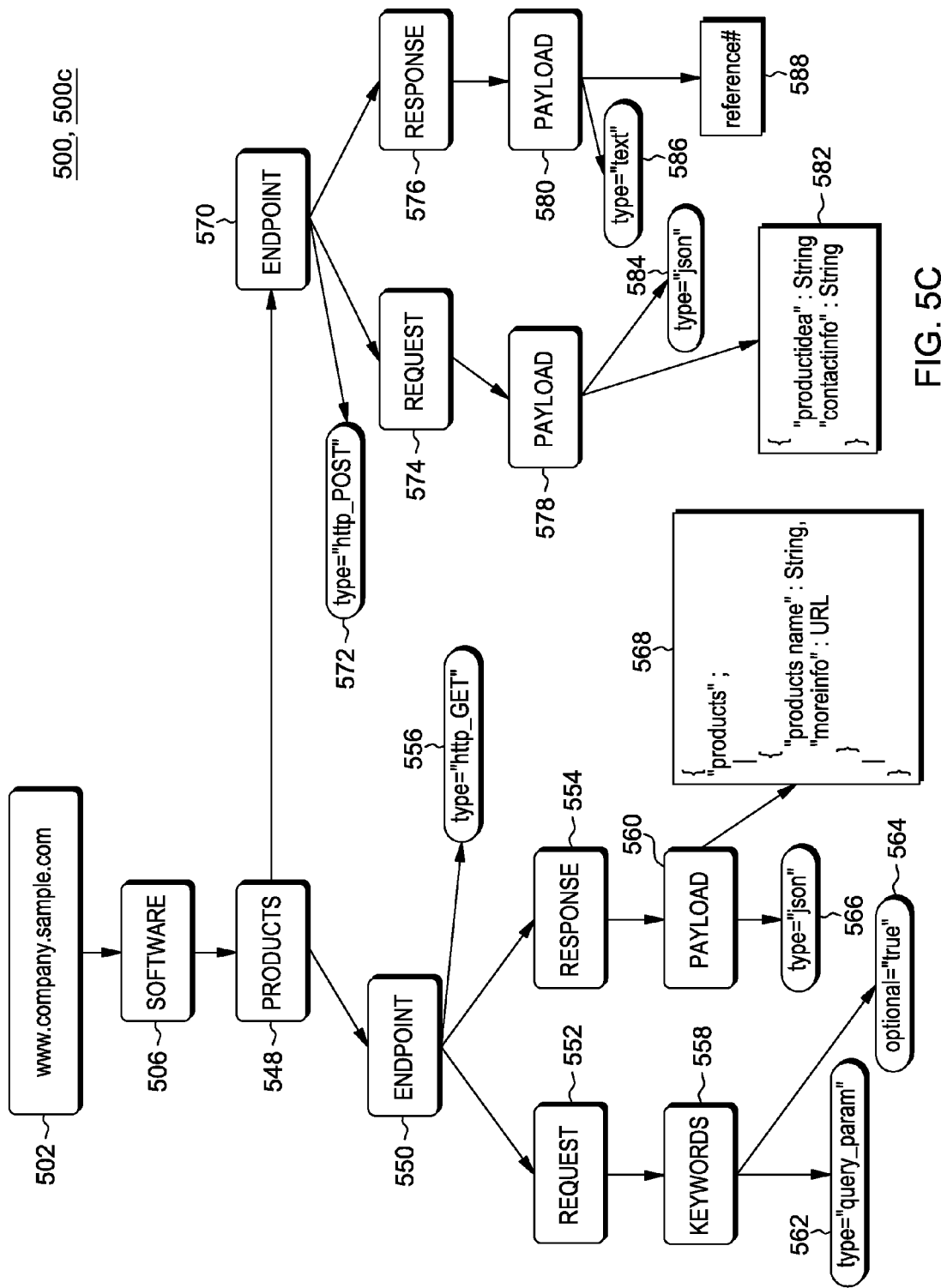
FIG. 5C is another diagram view of the second embodiment system.

As shown in FIG. 5C, let's say the REST APIs for www.company.sample.com/software/products are modeled as shown. This example continues to demonstrate how the object graph can help with this task.

This object graph further demonstrates that a GET (node 556) can be performed to www.company.sample.com/software/products using an optional query parameter "keywords" (node 558), and the machine logic returns back a JSON structure (node 568) as outlined in the payload node (node 560). This REST URL also allows for POST invocations (node 572), which push a JSON containing new product ideas and receives a reference number in return (node 588).

Figure 5D:
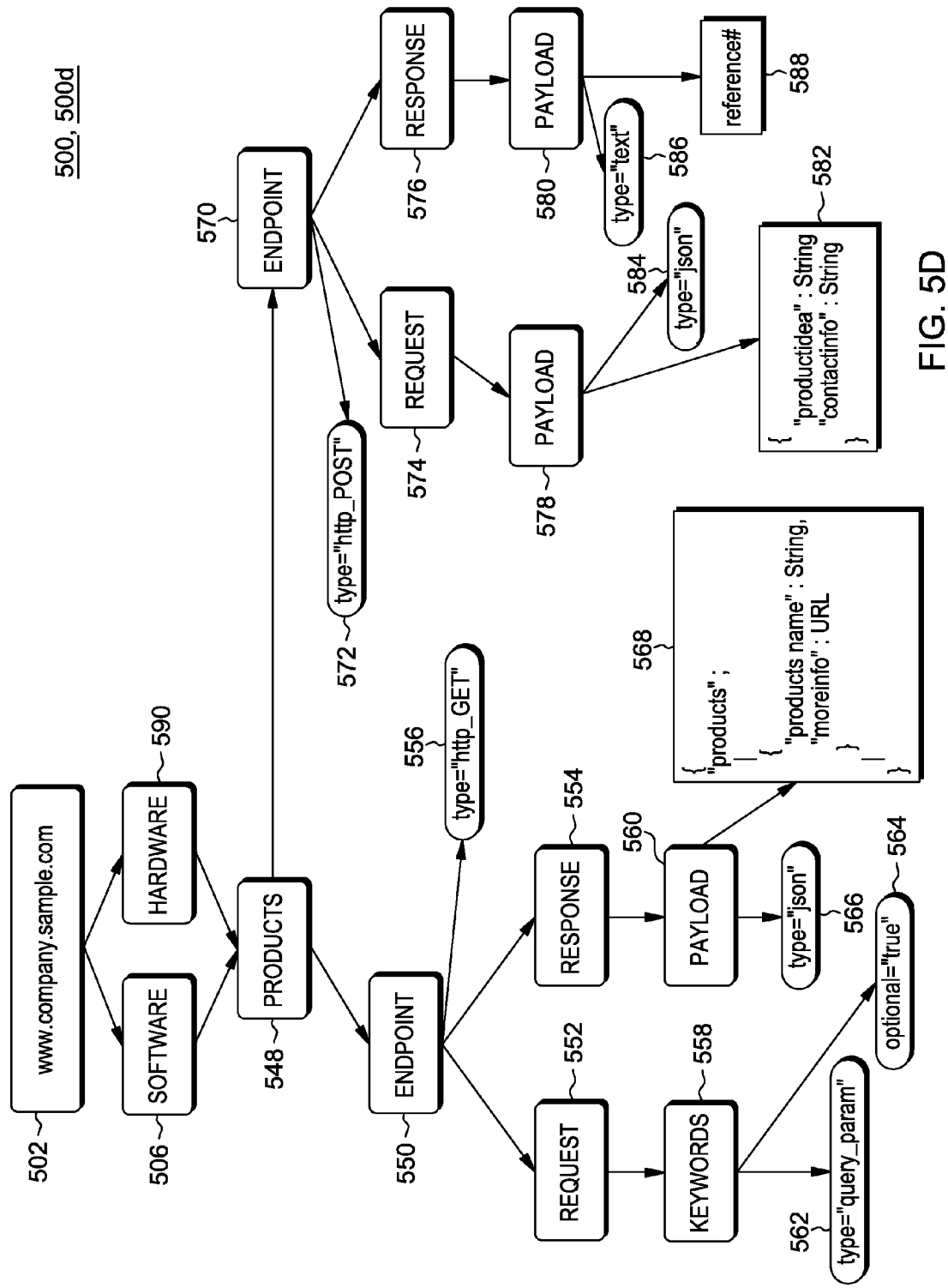
FIG. 5D is another diagram view of the second embodiment system.

As shown in FIG. 5D, now assume that the REST designer wants to make new a URL, called "www.company.sample.com/hardware/products" that has the exact same endpoint definitions as its software counterpart. In a non-object model, such a concept would be very hard to: (i) define; (ii); visualize, and/or (iii) expose. With the object model, it's as simple as linking the nodes together as a non-cyclic graph.

Node 590 represents the new URL, www.company.sample.com/hardware, and is now connected to the same "products" node (node 548) that software (node 506) is connected to, thus automatically making available the www.company.sample.com/hardware/products URL endpoints.

The object graph's visual representation can be tremendously helpful for designers and system administrators that are trying to manage a large set of REST APIs and quickly determine their relationships. Also, if object-based algorithms such as XQuery are applied on this graph, an immense amount of statistics can be obtained from their REST application such as: (i) how many instances of the same payload (nodes 560 and 578) are being returned from different endpoints; and/or (ii) what are some possible endpoint bottlenecks.

Large enterprise-level REST applications will often have different security models for various parts of the website. A section under "login" (node 510) might be strictly for administrators, and certain query pages for promotions might only be available to authorized partners. With a visual object-based model, it becomes very easy to apply and manage such different security domains.

Figure 5E:
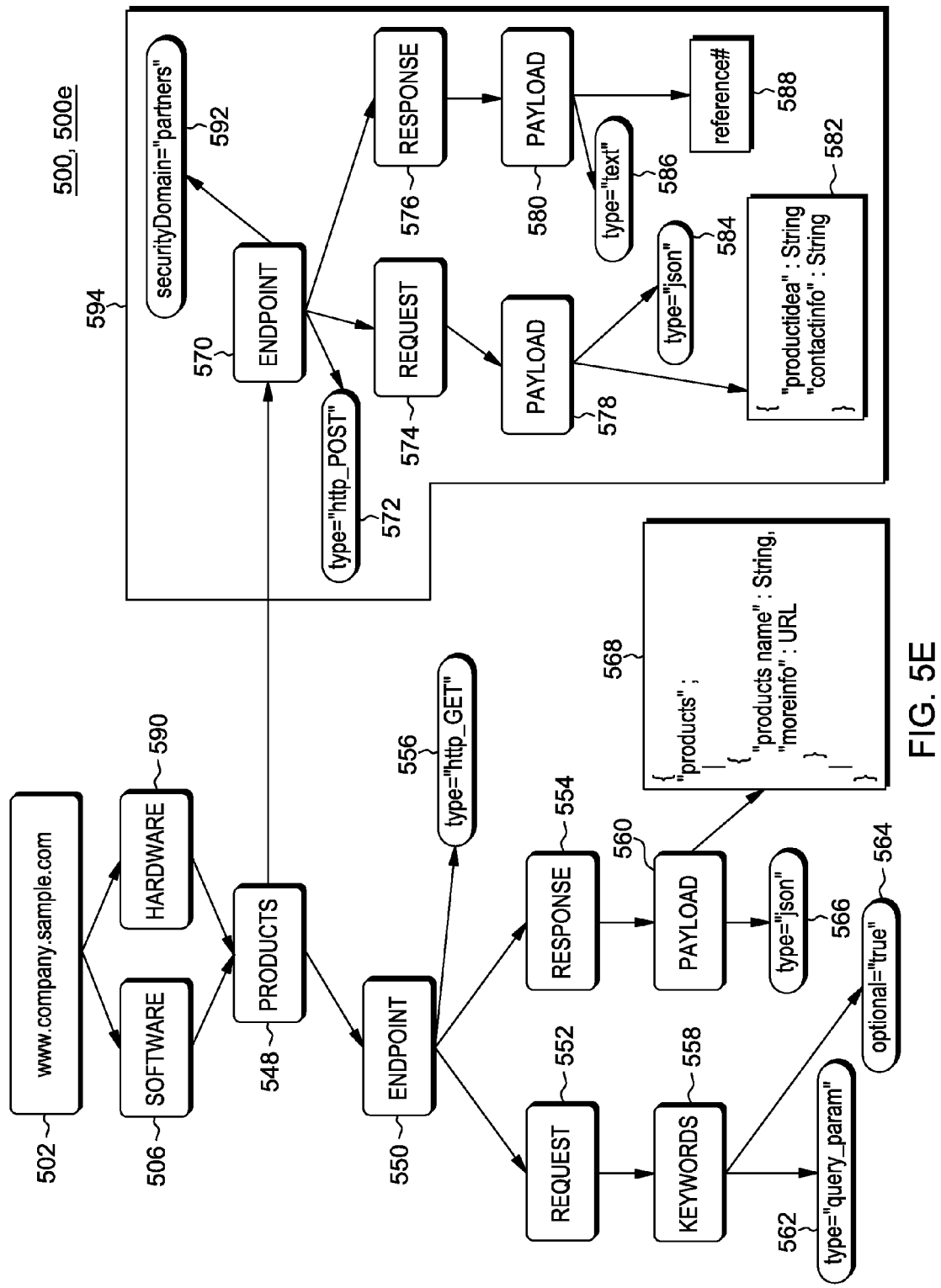
FIG. 5E is another diagram view of the second embodiment system.

As shown in FIG. 5E, the object graph illustrates that the system administrator has restricted the use of POST "www.company.sample.com/software/products" and POST www.company.sample.com/hardware/products (administrator node 594) to require partner-level authorization (node 592). It is extremely easy to visualize and manage different domains when working with an object model such as this. Other clear advantages are again the ease of doing an XPath search for all the nodes/APIs that reside in a particular security domain.

Figure 5F:
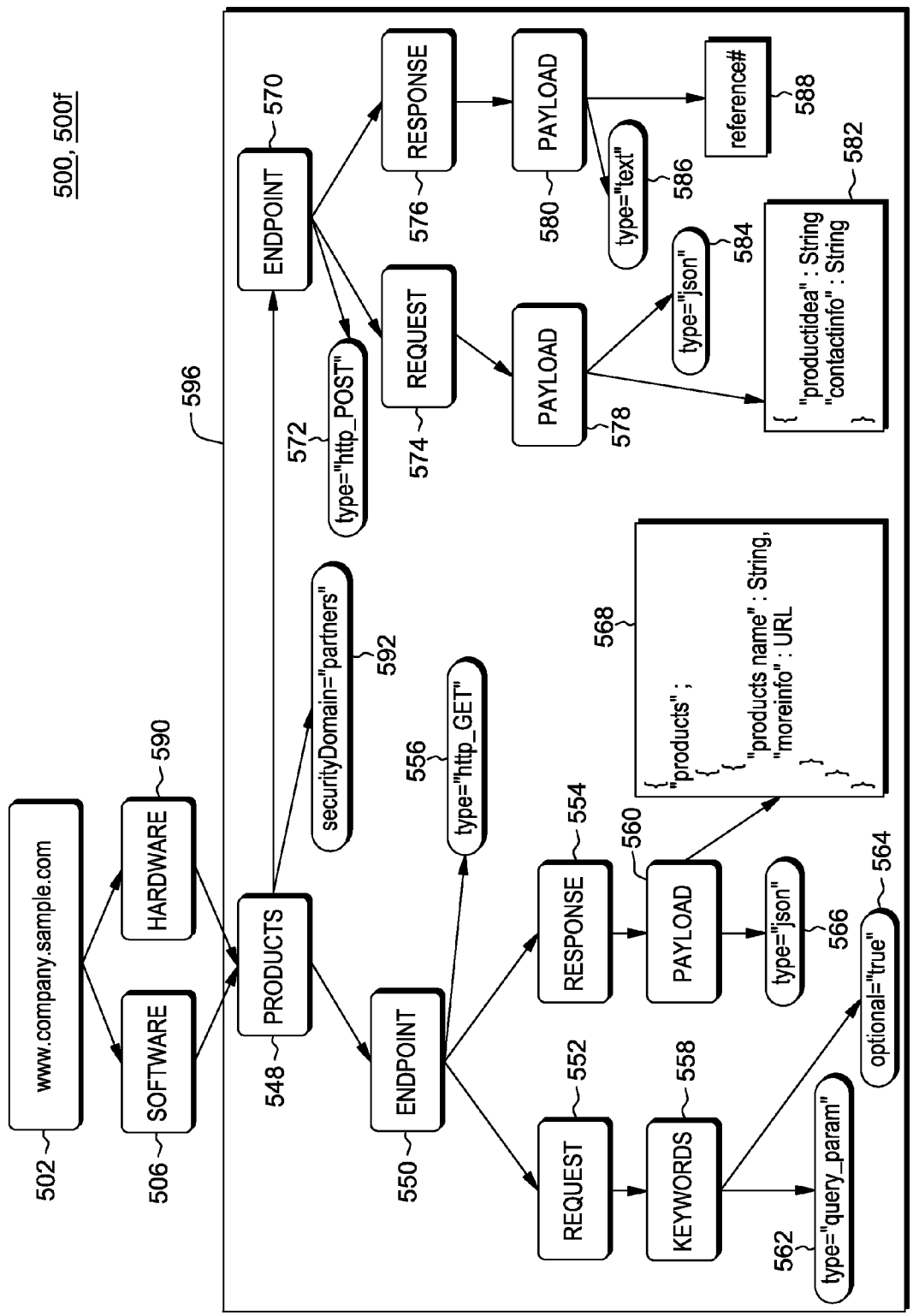
FIG. 5F is another diagram view of the second embodiment system.

As shown in FIG. 5F, if later on the system administrator decides that the partner security domain should also apply to "GET" operations (node 556) of the product URL, they can just move the attribute higher in the object tree (administrator node 596), since it applies to all descendants.

It is also worth mentioning that by having an object model of our REST APIs, the entire tree (or parts of it) can be quickly serialized into JSON and passed back to a client's JavaScript ("JavaScript" may be subject to trademark rights and/or registered as a trademark in various jurisdictions throughout the world) function for navigation. The object graph can impose restrictions in serialization such that restricted parts of the REST API do not get exposed in the object graph external representation, which is easily done by watching for the security domain attributes.

Some embodiments of the present invention may include one, or more, of the following characteristics, features and/or advantages: (i) produces a specialized graph that is the entire system (that is, it is the actual embodiment of the REST application); (ii) ability to modify the system by manipulating the graph; (iii) capable of attaching optional attributes and properties to the particular instance of the graph; (iv) changing a type instance of a resource has a clear bi-directional result; (v) the capability of adding a namespace to the graph and therefore be able to reference specific nodes either from its own graph or from a foreign graph; (vi) the capability to differentiate between multiple graphs (that is, different instances of the same type); (vii) relocation of a security attribute within the graph, thus changing the security domain of the application; (viii) a more flexible hierarchy in terms of the different hybrid graphs that can be accomplished, because it is based on concrete schema-based types and not just descriptions; (ix) models exactly how a system is and includes the complete set of REST components; (x) enhanced modeling and handling of advanced and/or enterprise level REST applications; and/or (xi) provides a visual graph model that represents the entire REST application.

Some embodiments of the present invention use and/or generate a non-cyclic graph that is stored and/or structured to allow for random access, meaning that someone navigating a parent node can go to a child node, and a child node allows the user to navigate back to its parent node.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/ or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A computer-implemented method for modeling a plurality REST (representational state transfer) APIs (application program interfaces), the computer-implemented method comprising:

receiving a REST schema data set including information defining a REST schema that includes a plurality of REST schema types;

receiving a domain data set identifying: (i) a set of domain(s), (ii) a URL (uniform resource locator) address where each domain of the set of domain(s) is located, and (iii) an authorization level required to access each domain of the set of domains;

dividing a web/REST application into a plurality of code portions;

for each given domain of the set of domain(s), receiving an endpoints data set for the given domain with each endpoint data set including information identifying: (i) a plurality of hypertext transport protocol (HTTP) endpoints belonging to the given domain, with some HTTP endpoints being code inclusive payload type HTTP endpoints which respectively include content respectively corresponding to the plurality of code portions, and (ii) a REST schema type respectively corresponding to the content of each HTTP endpoint; and creating, by machine logic and based upon the REST schema data set, the domain data set and the endpoints data set, at least a portion of an object graph data set that defines an object graph, with the object graph being organized so that: (i) each domain of the set of domain(s) is assigned a domain level node, (ii) each domain level node includes an authorization level attribute value corresponding to the authorization level of the domain corresponding to the domain level node; (iii) each HTTP endpoint is assigned an HTTP endpoint level node, (iv) each HTTP endpoint node includes a REST schema type value corresponding to the REST schema type of the corresponding HTTP endpoint, and (v) each HTTP endpoint level node is related as a child node, in the object graph, to at least one domain level node corresponding to the domain(s) to which the HTTP endpoint, corresponding to the HTTP endpoint level node, belongs;

wherein the creation of the object graph includes, for each given node corresponding to a code inclusive payload type HTTP endpoint, assigning a node type to the given node based on the REST schema.

2. The computer-implemented method of claim 1 further comprising:

receiving first request container data set including information identifying: (i) a first endpoint corresponding to the first request container data set, and (ii) a first payload type characterizing a payload type of payloads of requests designed to be received by the first endpoint corresponding to a first endpoint level node;

wherein the object graph is further organized so that: (i) the object graph further includes a first request container level node corresponding to the first request container data set, (ii) the first request level node is related as a child node to the first endpoint level node, (iii) the object graph further includes a first payload level node, (iv) the first payload level node includes a payload type value identifying the first payload type, and (v) the first payload level node is related as a child node to the first request level node.

3. The computer-implemented method of claim 2 wherein the first payload type is JSON (JavaScript Object Notation).

4. The computer-implemented method of claim 1 further comprising:

receiving first response container data set including information identifying: (i) a first endpoint corresponding to the first response container data set, and (ii) a first payload type characterizing a payload type of payloads of responses sent by the first endpoint corresponding to a first endpoint level node;

wherein the object graph is further organized so that: (i) the object graph further includes a first response container level node corresponding to the first response container data set, (ii) the first response level node is related as a child node to the first endpoint level node, (iii) the object graph further includes a first payload level node, (iv) the first payload level node includes a payload type value identifying the first payload type, and (v) the first payload level node is related as a child node to the first response level node.

5. The computer-implemented method of claim 4 wherein the first payload type is text.

6. The computer-implemented method of claim 1 further comprising:

receiving first request container data set including information identifying: (i) a first endpoint corresponding to the first request container data set, and (ii) a first payload type characterizing a payload type of payloads of requests designed to be received by the first endpoint corresponding to a first endpoint level node; and receiving first response container data set including information identifying: (i) a first endpoint corresponding to the first response container data set, and (ii) a second payload type characterizing a payload type of payloads of responses sent by the first endpoint corresponding to a first endpoint level node;

wherein the object graph is further organized so that: (i) the object graph further includes a first request container level node corresponding to the first request container data set, (ii) the first request level node is related as a child node to the first endpoint level node, (iii) the object graph further includes a first payload level node, (iv) the first payload level node includes a payload type value identifying the first payload type, and (v) the first payload level node is related as a child node to the first request level node, (vi) the object graph further includes a first response container level node corresponding to the first response container data set, (vii) the first response level node is related as a child node to the first endpoint level node, (viii) the object graph further includes a second payload level node, (ix) the second payload level node includes a payload type value identifying the second payload type, and (x) the second payload level node is related as a child node to the first response level node.

7. A computer program product (CPP) for modeling a plurality REST (representational state transfer) APIs (application program interfaces), the CPP comprising:

a machine readable storage device; and computer code stored on the machine readable storage device, with the computer code including instructions for causing a processor(s) set to perform operations including the following:

receiving a REST schema data set including information defining a REST schema that includes a plurality of REST schema types, receiving a domain data set identifying: (i) a set of domain(s), (ii) a URL (uniform resource locator) address where each domain of the set of domain(s) is located, and (iii) an authorization level required to access each domain of the set of domains, dividing a web/REST application into a plurality of code portions, for each given domain of the set of domain(s), receiving an endpoints data set for the given domain with each endpoint data set including information identifying: (i) a plurality of hypertext transport protocol (HTTP) endpoints belonging to the given domain, with some HTTP endpoints being code inclusive payload type HTTP endpoints which respectively include content respectively corresponding to the plurality of code portions, and (ii) a REST schema type respectively corresponding to the content of each HTTP endpoint, and creating, by machine logic and based upon the REST schema data set, the domain data set and the endpoints data set, at least a portion of an object graph data set that defines an object graph, with the object graph being organized so that: (i) each domain of the set of domain(s) is assigned a domain level node, (ii) each domain level node includes an authorization level attribute value corresponding to the authorization level of the domain corresponding to the domain level node; (iii) each HTTP endpoint is assigned an HTTP endpoint level node, (iv) each HTTP endpoint node includes a REST schema type value corresponding to the REST schema type of the corresponding HTTP endpoint, and (v) each HTTP endpoint level node is related as a child node, in the object graph, to at least one domain level node corresponding to the domain(s) to which the HTTP endpoint, corresponding to the HTTP endpoint level node, belongs;

wherein the creation of the object graph includes, for each given node corresponding to a code inclusive payload type HTTP endpoint, assigning a node type to the given node based on the REST schema.

8. The CPP of claim 7 wherein the computer code further includes instructions for causing the processor(s) set to perform the following operations:

receiving first request container data set including information identifying: (i) a first endpoint corresponding to the first request container data set, and (ii) a first payload type characterizing a payload type of payloads of requests designed to be received by the first endpoint corresponding to a first endpoint level node;

wherein the object graph is further organized so that: (i) the object graph further includes a first request container level node corresponding to the first request container data set, (ii) the first request level node is related as a child node to the first endpoint level node, (iii) the object graph further includes a first payload level node, (iv) the first payload level node includes a payload type value identifying the first payload type, and (v) the first payload level node is related as a child node to the first request level node.

9. The CPP of claim 8 wherein the first payload type is JSON (JavaScript Object Notation).

10. The CPP of claim 7 wherein the computer code further includes instructions for causing the processor(s) set to perform the following operations:

receiving first response container data set including information identifying: (i) a first endpoint corresponding to the first response container data set, and (ii) a first payload type characterizing a payload type of payloads of responses sent by the first endpoint corresponding to a first endpoint level node;

wherein the object graph is further organized so that: (i) the object graph further includes a first response container level node corresponding to the first response container data set, (ii) the first response level node is related as a child node to the first endpoint level node, (iii) the object graph further includes a first payload level node, (iv) the first payload level node includes a payload type value identifying the first payload type, and (v) the first payload level node is related as a child node to the first response level node.

11. The CPP of claim 10 wherein the first payload type is text.

12. The CPP of claim 7 wherein the computer code further includes instructions for causing the processor(s) set to perform the following operations:
receiving first request container data set including information identifying: (i) a first endpoint corresponding to the first request container data set, and (ii) a first payload type characterizing a payload type of payloads of requests designed to be received by the first endpoint corresponding to a first endpoint level node; and
receiving first response container data set including information identifying: (i) a first endpoint corresponding to the first response container data set, and (ii) a second payload type characterizing a payload type of payloads of responses sent by the first endpoint corresponding to a first endpoint level node;
wherein the object graph is further organized so that: (i) the object graph further includes a first request container level node corresponding to the first request container data set, (ii) the first request level node is related as a child node to the first endpoint level node, (iii) the object graph further includes a first payload level node, (iv) the first payload level node includes a payload type value identifying the first payload type, and (v) the first payload level node is related as a child node to the first request level node, (vi) the object graph further includes a first response container level node corresponding to the first response container data set, (vii) the first response level node is related as a child node to the first endpoint level node, (viii) the object graph further includes a second payload level node, (ix) the second payload level node includes a payload type value identifying the second payload type, and (x) the second payload level node is related as a child node to the first response level node.

13. A computer system comprising for modeling a plurality REST (representational state transfer APIs (application program interfaces), the computer-implemented system comprising:
a processor(s) set;
a machine readable storage device; and
computer code stored on the machine readable storage device, with the computer code including instructions for causing the processor(s) set to perform operations including the following:
receiving a REST schema data set including information defining a REST schema that includes a plurality of REST schema types,
receiving a domain data set identifying: (i) a set of domain(s), (ii) a URL (uniform resource locator) address where each domain of the set of domain(s) is located, and (iii) an authorization level required to access each domain of the set of domains,
dividing a web/REST application into a plurality of code portions,
for each given domain of the set of domain(s), receiving an endpoints data set for the given domain with each endpoint data set including information identifying: (i) a plurality of hypertext transport protocol (HTTP) endpoints belonging to the given domain, with some HTTP endpoints being code inclusive payload type HTTP endpoints which respectively include content respectively corresponding to the plurality of code portions, and (ii) a REST schema type respectively corresponding to the content of each HTTP endpoint, and
creating, by machine logic and based upon the REST schema data set, the domain data set and the endpoints data set, at least a portion of an object graph data set that defines an object graph, with the object graph being organized so that: (i) each domain of the set of domain(s) is assigned a domain level node, (ii) each domain level node includes an authorization level attribute value corresponding to the authorization level of the domain corresponding to the domain level node; (iii) each HTTP endpoint is assigned an HTTP endpoint level node, (iv) each HTTP endpoint node includes a REST schema type value corresponding to the REST schema type of the corresponding HTTP endpoint, and (v) each HTTP endpoint level node is related as a child node, in the object graph, to at least one domain level node corresponding to the domain(s) to which the HTTP endpoint, corresponding to the HTTP endpoint level node, belongs;
wherein the creation of the object graph includes, for each given node corresponding to a code inclusive payload type HTTP endpoint, assigning a node type to the given node based on the REST schema.

14. The computer system of claim 13 wherein the computer code further includes instructions for causing the processor(s) set to perform the following operations:
receiving first request container data set including information identifying: (i) a first endpoint corresponding to the first request container data set, and (ii) a first payload type characterizing a payload type of payloads of requests designed to be received by the first endpoint corresponding to a first endpoint level node;
wherein the object graph is further organized so that: (i) the object graph further includes a first request container level node corresponding to the first request container data set, (ii) the first request level node is related as a child node to the first endpoint level node, (iii) the object graph further includes a first payload level node, (iv) the first payload level node includes a payload type value identifying the first payload type, and (v) the first payload level node is related as a child node to the first request level node.

15. The computer system of claim 14 wherein the first payload type is JSON (JavaScript Object Notation).

16. The computer system of claim 13 wherein the computer code further includes instructions for causing the processor(s) set to perform the following operations:
receiving first response container data set including information identifying: (i) a first endpoint corresponding to the first response container data set, and (ii) a first payload type characterizing a payload type of payloads of responses sent by the first endpoint corresponding to a first endpoint level node;
wherein the object graph is further organized so that: (i) the object graph further includes a first response container level node corresponding to the first response container data set, (ii) the first response level node is related as a child node to the first endpoint level node, (iii) the object graph further includes a first payload level node, (iv) the first payload level node includes a payload type value identifying the first payload type, and (v) the first payload level node is related as a child node to the first response level node.

17. The computer system of claim 16 wherein the first payload type is text.

18. The computer system of claim 13 wherein the computer code further includes instructions for causing the processor(s) set to perform the following operations:
   receiving first request container data set including information identifying: (i) a first endpoint corresponding to the first request container data set, and (ii) a first payload type characterizing a payload type of payloads of requests designed to be received by the first endpoint corresponding to a first endpoint level node; and
   receiving first response container data set including information identifying: (i) a first endpoint corresponding to the first response container data set, and (ii) a second payload type characterizing a payload type of payloads of responses sent by the first endpoint corresponding to a first endpoint level node;
   wherein the object graph is further organized so that: (i) the object graph further includes a first request container level node corresponding to the first request container data set, (ii) the first request level node is related as a child node to the first endpoint level node, (iii) the object graph further includes a first payload level node, (iv) the first payload level node includes a payload type value identifying the first payload type, and (v) the first payload level node is related as a child node to the first request level node, (vi) the object graph further includes a first response container level node corresponding to the first response container data set, (vii) the first response level node is related as a child node to the first endpoint level node, (viii) the object graph further includes a second payload level node, (ix) the second payload level node includes a payload type value identifying the second payload type, and (x) the second payload level node is related as a child node to the first response level node.

\* \* \* \* \*